C. BERGER.
SOUND OPERATED CIRCUIT CONTROLLER.
APPLICATION FILED NOV. 14, 1918.
1,405,708.
Patented Feb. 7, 1922.
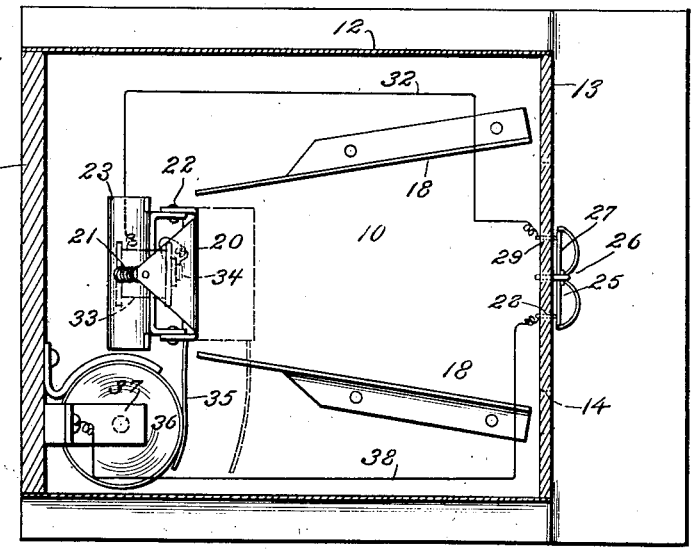
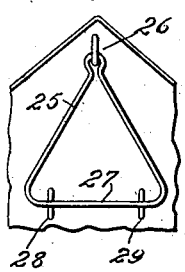
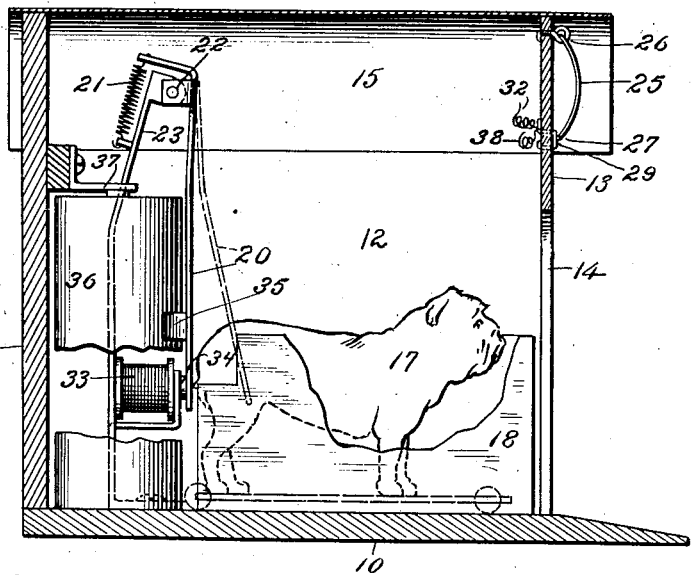
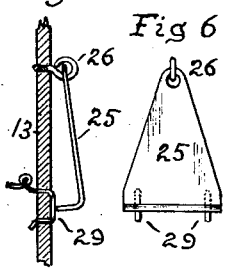
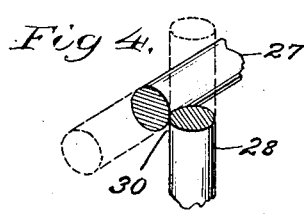
INVENTOR
Christian Berger,
BY
Rogers, Kennedy + Campbell
ATTORNEYS.

UNITED STATES PATENT OFFICE.

CHRISTIAN BERGER, OF NEW YORK, N. Y., ASSIGNOR TO FREDERICK L. SAWYER, OF EVANSTOWN, ILLINOIS.

SOUND-OPERATED CIRCUIT CONTROLLER.

1,405,708.      Specification of Letters Patent.     Patented Feb. 7, 1922.

Application filed November 14, 1918. Serial No. 262,516.

*To all whom it may concern:*

Be it known that I, CHRISTIAN BERGER, a citizen of the United States, residing at New York city, in the county of New York and State of New York, have invented certain new and useful Improvements in Sound-Operated Circuit Controllers, of which the following is a specification, reference being had therein to the accompanying drawing.

This invention relates to sound operated apparatus and circuit controller therefor, and is available for use in various kinds of mechanisms or instruments, such for example as those referred to in my prior Patents Nos. 1,209,636, patented December 19, 1916, and 1,279,831, patented September 24, 1918.

The main object of the present invention is to afford a sound operated circuit controller and an apparatus controlled thereby which will be more effective and reliable in action, less difficult and expensive of construction, and more convenient and durable in use. Other and more specific objects and advantages will appear in the hereinafter following description of one form of embodiment of the invention or will be apparent to those skilled in the art. To the attainment of such objects and advantages, the present invention consists in the novel sound operated circuit controller, apparatus controlled thereby, and features of combination and arrangement and construction which are herein shown or described.

In the accompanying drawing forming a part hereof, Fig. 1 is a plan view with the top parts removed, and partly in section. Fig. 2 is a left elevation with the side wall removed, and partly in section. Fig. 3 is a front view of the upper part of the front wall showing the sound operated circuit controller. Fig. 4 is an enlarged perspective showing the nature of the point contact. Figs. 5 and 6 are left and front elevations of a slightly modified form of controller made from a plate instead of wire.

As an illustrative embodiment I have shown the principles of the present invention applied to a toy, for example of the kind wherein the figure of a dog or the like is caused to come out from an inclosure or house upon the utterance of a call or other noise uttered at the distance of a few feet or yards.

In the drawings such an apparatus is shown having a base or floor 10, above which is an enclosure formed by rear wall 11, side walls 12, 12, a front wall 13 which is extra thin and easily vibratable and has an opening or doorway 14, and a roof 15.

Inside the structure is shown a toy figure, namely a dog 17, and attached to the floor at each side of the dog is a wall or guide 18 arranged to insure the dog moving properly in its outward and inward movements.

For causing the dog to come out from the house at the proper time, a propelling device is shown comprising a flapper or pusher member 20 which also serves as an armature, as will be explained. This flapper is acted upon by a spring 21 which tends to swing the flapper about its pivot 22 provided at the top end of a stationary upright bracket 23.

Coming now to the circuit controller and electric connections, the front wall 13 serves as a diaphragm member and opposed to this is a pendulous member 25, the latter being accessibly hung detachably at the exterior upper side of the front wall so that it may be easily applied and removed for cleaning the contacts; and when in place the pendulum has a certain amount of side play or looseness so that the user may work it around to clean and brighten the contacts. The pendulous member 25 is preferably a light pendulum suspended or hung from a pivot 26 at its upper portion, and its lower portion having horizontally spaced apart points, being formed for example with a horizontally extending portion 27. This, as will appear, permits two contact pairs to be employed between the pendulum and diaphragm, spaced apart substantially from each other. At the front side of the diaphragm is a contact 28 and another one 29 spaced and insulated from it, and the bar 27 rests by gravity lightly against both of the contacts 28 and 29. All these parts 25, 27, 28, 29, may conveniently be constructed of thin bars or wires, such as No. 18 brass wire, having rounded or convex exterior. By reason of this and the fact that each contact pair 27—28 or 27—29 consists of non-parallel but tangentially contacting bars or wires, a point contact 30, as seen in Fig. 4, is afforded giving very minute area as is desirable, in a very simple, effective and durable manner.

As explained, the two contact pairs are spaced apart horizontally substantially below the suspension pivot thus forming the three apexes of a triangle, and the pendulum may take the form of a wire triangle, although for certain purposes, a pendulum on the same principles might be constructed of different physical shape. With the described arrangement it is only necessary to pass the electric circuit in series through the successive contact pairs and thereby the sensitiveness of the instrument is doubled, for a separation of contact at either pair will break the circuit and operate the instrument.

Thus the course of the electric circuit may be as follows. From the contact 28 on the diaphragm into the contact bar 27 of the pendulum, and from there into the second diaphragm contact 29, thence by a conductor 32 to one terminal of a magnet coil 33 the other terminal of which may be connected to the magnet core 34 which is located directly behind the armature or flapper 20 already described. The circuit passes thence from the magnet core 34 into the armature or flapper 20, and from there to a movable battery contact 35 constituting an extension carried at one side of the armature 20. The contact 35 contacts the exterior of the battery 36 from which the circuit continues through a second battery contact 37 and a conductor 38 back to the first mentioned diaphragm contact 28.

To set the apparatus, the dog figure is thrust inwardly so as to cause the armature 20 to contact the magnet 34. At the same time the battery contact 35 contacts the battery 36 and a current flows which energizes the magnet sufficiently to hold the parts in this position, as shown in full lines in the figures. Upon the utterance of a sound sufficient to vibrate the diaphragm 13, the disturbance jars the little balanced pendulum member 25 which causes a practical breaking of the circuit so that the current is interrupted or decreased sufficiently to permit the magnet to release its armature. The spring 21 asserts itself and throws the armature or flapper 20 forwardly to the dotted line position thus propelling the dog through the doorway 14. At the same time the movement of the armature carries the contact 35 away from the battery 36 so that normally there is no waste of battery strength.

The detector shown in Figs. 5 and 6 is on the same principles as that shown in the other figures, and is also so bent or shaped that its center of gravity is slightly forward of the contact points, thereby giving a delicate contacting pressure. The pendulous member of Figs. 5 and 6, however, involves a plate pivoted at the top and bent so as to have the desired electrical contact against the two stationary wires or wire stitches 29, formed in the wall or diaphragm member 13. In both forms of detector it will be noticed that the hinge 26 at the top is nothing more than a hinge, and is not in circuit or series with the electrical current. Both of the contact points are at the lower edge removed from the pivot. This structure, while very simple, is very efficient. It may be located at the exterior side of the apparatus, and is not easily subject to injury, as its parts are simply and strongly constructed. The exterior location gives easy access for the purpose of renewing the contact surfaces, which may readily be done without injury by a simple manipulation or rubbing of the pendulous member 25 against its two contacts 29. This action brightens up the contacting surfaces. The double lower contact practically gives double sensitiveness, since separation at either point will disrupt the circuit, and this result is accomplished while preserving the delicacy of action and freedom of movement of the pendulum, which swings from its pivot without interference by attachments or adjuncts.

I believe this is the first apparatus in which the diaphragm member has two or more contacts each having opposite it a contact member capable of separation from it, and a circuit passing in series through the two pairs of contacts. It will be understood that, as regards this part of the invention, the two contact pairs might be variously arranged and might even be on different walls of the structure. I further have in mind a reversal of the illustrated arrangement, namely, wherein the current passes first into a pendulum contact and thence to a diaphragm contact before passing to the other pendulum contact, the two pendulum contacts being insulated. The feature of a crossed wire contact wherein two non-parallel wires standing in parallel planes contact each other tangentially, might be employed in various situations, for example with a pendulum as in said prior application, wherein the current enters the pendulum through the separable contact and leaves it through its pivot. Many other sorts of toys and instruments may be controlled by the controller hereof.

It will thus be seen that I have described a sound operated circuit controller and apparatus operated thereby embodying the principles and attaining the advantages of the present invention. Since many matters of combination, arrangement, structure, design, and detail may be modified without departing from the underlying principles, I do not restrict the invention to such features except so far as specified in the appended claims.

What is claimed is:

1. A housing for a toy or the like, a plurality of contacts on a wall of said housing, a pendulous member carrying a conducting bridge normally connecting said contacts and adapted to be separated by vibrations of said wall when sound waves impinge thereon.

2. A housing for a toy or the like, a plurality of contacts on a wall of said housing, a pendulous member carrying a conducting bridge normally connecting said contacts and adapted to be separated by vibrations of said wall when sound waves impinge thereon, said contacts and pendulous member being at the exterior surface of said wall, whereby they are accessible for cleaning and adjustment.

3. A housing for a toy or the like, a plurality of contacts on a wall of said housing, a pendulous member having means for suspending it on said wall and carrying a conducting bridge below the suspension point normally connecting said contacts and adapted to be separated by vibrations of said wall when sound waves impinge thereon.

4. A housing for a sound operated toy, having a wall or walls arranged to vibrate by the action of sound waves, and electric contact means mounted directly on a housing wall, whereby sound waves may effect a breaking of contact.

In testimony whereof, I have affixed my signature hereto.

CHRISTIAN BERGER.